United States Patent [19]

Loomis et al.

[11] Patent Number: 4,613,533
[45] Date of Patent: Sep. 23, 1986

[54] THERMOPLASTIC ELASTOMERIC COMPOSITIONS BASED ON COMPATIBLE BLENDS OF AN ETHYLENE COPOLYMER AND VINYL OR VINYLIDENE HALIDE POLYMER

[75] Inventors: Gary L. Loomis, Drexel Hill; Robert J. Statz, Kennett Square, both of Pa.

[73] Assignee: E. I. Du Pont de Nemours and Company, Wilmington, Del.

[21] Appl. No.: 732,090

[22] Filed: May 9, 1985

Related U.S. Application Data

[63] Continuation-in-part of Ser. No. 572,078, Jan. 19, 1984, abandoned, which is a continuation-in-part of Ser. No. 427,413, Sep. 29, 1982, abandoned, which is a continuation-in-part of Ser. No. 394,329, Jul. 1, 1982, abandoned.

[51] Int. Cl.⁴ .................. C08K 5/12; C08L 45/00; C08L 27/00; F16L 9/12

[52] U.S. Cl. ...................... 428/36; 428/265; 428/267; 428/290; 428/394; 524/296; 524/298; 524/413; 524/422; 524/427; 524/430; 524/444; 524/445; 524/502; 524/513; 524/514; 524/518; 524/522; 524/523; 524/524; 524/527; 525/185; 525/189; 525/211; 525/221; 525/222; 525/289; 525/301; 525/302; 525/308; 525/312; 525/317

[58] Field of Search ............ 524/422, 427, 444, 445, 524/502, 513, 514, 518, 527, 430, 522, 523, 524, 296, 297, 298; 525/185, 289, 301, 302, 308, 312, 317, 189, 211, 221, 222; 428/36, 265, 267, 290, 394

[56] References Cited

U.S. PATENT DOCUMENTS

| | | | |
|---|---|---|---|
| 3,156,744 | 11/1964 | Mullins | 525/185 |
| 3,553,348 | 1/1971 | Betts | 174/110 |
| 4,340,530 | 7/1982 | Higashiguchi et al. | 524/516 |
| 4,379,888 | 4/1983 | Yoshimura et al. | 525/211 |

OTHER PUBLICATIONS

Chem Abs. 95-188466 "Poly(vinyl chloride) Compositions" Japanese Kokai 81,100,815 (Aug. 13, 1981).
Derwent Abs. 61625 D/34 (NL8007040) 8-81.
Derwent Abs. 70816 D/39 (J56100815) 8-81.

*Primary Examiner*—Herbert J. Lilling

[57] ABSTRACT

A thermoplastic, melt-processible, elastomeric composition based on partially crosslinked compatible blends of an ethylene copolymer and a vinyl or vinylidene halide polymer.

21 Claims, No Drawings

THERMOPLASTIC ELASTOMERIC COMPOSITIONS BASED ON COMPATIBLE BLENDS OF AN ETHYLENE COPOLYMER AND VINYL OR VINYLIDENE HALIDE POLYMER

This is a continuation-in-part of our copending application Ser. No. 572,078, filed Jan. 19, 1984, now abandoned, which was a continuation-in-part of our then copending application Ser. No. 427,413 filed Sept. 29, 1982, which was a continuation-in-part of then copending application Ser. No. 394,329 filed July 1, 1982, both now abandoned.

BACKGROUND

Blends of ethylene copolymers and vinyl halide polymers crosslinked during or subsequent to molding into shaped articles are known in the art as detailed in French Pat. No. 2,148,496. The molded articles prepared from these compositions, however, suffer the disadvantage of being thermoset due to the high degree of crosslinking effectuated and, hence, are not reprocessible or remoldable.

Elastomeric thermoplastic compositions based on partially crosslinked incompatible blends of polypropylene and ethylene/vinyl acetate copolymers are also known in the art as detailed in U.S. Pat. No. 4,232,132. This incompatibility results in a multiphase system having a crosslinked elastomeric phase and an uncrosslinked hard phase. However, the elastomeric properties of these compositions (e.g. % permanent tensile set) are poor relative to the elastomeric properties of the compositions of the subject invention.

SUMMARY OF THE INVENTION

The subject invention is a thermoplastic, inherently melt-processible elastomeric composition based on partially crosslinked compatible blends of an ethylene copolymer and a vinyl or vinylidene halide polymer. The melt processibility of these compositions allows shaped articles to be molded therefrom without the time consuming cure step required with conventional rubbers.

More specifically, the subject invention is partially crosslinked, thermoplastic, melt-processible, elastomeric blend of (a) a copolymer of ethylene, one or more ethylenically unsaturated organic monomers other than an unsaturated carboxylic acid, and an additional monomer selected from the group consisting of an ethylenically unsaturated $C_3$-$C_{20}$ carboxylic acid, carbon monoxide, and sulfur dioxide; and (b) between 5 and 75 weight percent, based on the composition, of a vinyl or vinylidene halide polymer wherein the comonomer content in (a) is such that the ethylene copolymer is compatible with the vinyl or vinylidene halide polymer.

DETAILED DESCRIPTION

The ethylene copolymers useful in the practice of the subject invention can be represented as having the formula E/X/Y, where X is an ethylenically unsaturated organic monomer other than an unsaturated carboxylic acid, and Y is an ethylenically unsaturated carboxylic acid, carbon monoxide, or sulfur dioxide. Exemplary of the organic monomers are those selected from the group consisting of esters of said unsaturated mono- or dicarboxylic acids, vinyl esters of saturated carboxylic acids where the acid group has 2-18 carbon atoms, vinyl alkyl ethers wherein the alkyl group has 1-18 carbon atoms, vinyl or vinylidene halides, acrylonitrile, methacrylonitrile, norbornene, alpha-olefins of 3-12 carbon atoms, and vinyl aromatic compounds. Preferred organic monomers include methyl acrylate, butyl acrylate and vinyl acetate. The melt index range for these copolymers is 0.1 to 1000 (ASTM D-1238), preferably 1 to 100.

The ethylene copolymers useful in the practice of the subject invention need have sufficient comonomer copolymerized therein to exhibit compatability with the vinyl and vinylidene halide polymers described below. Generally speaking, the ethylene content in these terpolymers should be 40 to 85 percent, the X monomer content 1 to 60 percent, and the Y monomer content 1 to 30 percent, all based on polymer weight. When an ethylene copolymer is used which is not sufficiently compatible with the vinyl or vinylidene polymers, shaped articles molded from the blends are opaque, show stress whitening when stretched and lack the required recovery to be considered elastomeric. A more detailed discussion of the compatability of these ethylene copolymers with vinyl and vinylidene halide polymers, as well as a discussion of the preparation of the copolymers can be found in *Polymer-Polymer Miscibility*, O. Olabisi, L. M. Robeson and M. T. Shaw, Academic Press, N.Y., N.Y., 1979, U.S. Pat. No. 3,684,778 and U.S. Pat. No. 3,780,140, all herein incorporated by reference.

The ethylene copolymers described above are blended in accordance with the subject invention with 5 to 75, preferably 20 to 60, weight percent based on the blended composition of vinyl or vinylidene halide polymers including copolymers resulting from copolymerization with a comonomer selected from the group consisting of vinyl esters, acrylonitrile, acrylic esters, vinylidene chloride, vinyl chloride, esters of unsaturated carboxylic acids and vinyl ethers. For example, polyvinyl chloride having an inherent viscosity of 0.30 to 1.4 (ASTM D-1243) is generally useful in the practice of the subject invention.

The blending of the ethylene copolymer with the vinyl or vinylidene halide polymer is accomplished by any one of a number of conventional techniques, for example, in a Banbury mixer, two-roll mill or extruder. This blending is done at a temperature high enough to soften the polymers for adequate blending, but not so high as to degrade the vinyl or vinylidene halide polymer. Generally speaking this blending temperature ranges from 140 to 200° C., and blending is carried out for a time sufficient to homogeneously blend the components.

The critical aspect of the subject invention is the partial crosslinking of the ethylene copolymer in the compatible blend. This can be carried out using any one or more of the well known crosslinking techniques including electron beam irradiation, gamma irradiation and free radical curatives such as peroxides. The crosslinking of the ethylene copolymer according to this invention can be carried out before or concurrently with blending with the vinyl or vinylidene halide polymers, or after such blending when using radiation techniques to effectuate the crosslinking. If the ethylene copolymer in the blend contains carbon monoxide, diamines such as methylene dianiline or p-phenylene diamine can be used to effectuate the desired crosslinking. If the ethylene copolymer is ethylene/vinyl acetate/carbon monoxide, sulfur vulcanizing agents can be used as detailed in U.S. Pat. No. 4,172,939. For crosslinking ethylene copolymers containing carboxylic acid functionalities, the formation of ionic crosslinks is suitable in the practice of the subject invention, and is achieved with various metal oxides or hydroxides such as ZnO and NaOH, or with organometallics such as chromium acetylacetone, as detailed in U.S. Pat. No. 4,304, 887.

When crosslinking is effected in the presence of a free radical generator, it often is useful to add a polyunsaturated compound to the blend, e.g., m-phenylene-bis-maleimide or triallyl cyanurate, to improve the crosslinking efficiency and to reduce the amount of free radical generator required. When other crosslinking methods are employed, e.g., curing with diamines, sulfur, or metal compounds, such polyunsaturated compounds are not used.

The term "partially crosslinked" refers to a degree of crosslinking sufficient to transform a blend of an ethylene copolymer as detailed above and a vinyl or vinylidene halide polymer into the thermoplastic elastomeric blends of the subject invention. To quantify the degree of crosslinking, the amount of insoluble, and hence crosslinked, polymer is determined by soaking a sample of the polymer, after crosslinking, in tetrahydrofuran at 23° C. for 16 hours, isolating the insoluble portion and weighing the dried residue, making suitable corrections based upon knowledge of the composition. For example, the weight of components soluble in tetrahydrofuran such as plasticizers are subtracted from the initial weight; and components insoluble in tetrahydrofuran, such as pigments, fillers, etc. are subtracted from both the initial and final weight. The insoluble polymer recovered is reported as percent gel content. This procedure is based on a conventional procedure for quantifying degree of crosslinking that is more fully detailed in U.S. Pat. No. 3,203,937. For purposes of the subject invention, the polymer blends need be partially crosslinked so that they have a gel content of 5 to 90 percent, preferably 10 to 70 percent based on total polymer. The conditions under which this crosslinking is carried out, i.e., type and quantity of crosslinking agent, crosslinking time and temperature, to arrive at a composition having a gel content within this operable range, can be determined empirically. When chemical crosslinking agents are utilized, it is preferable that they be substantially totally consumed during the crosslinking step.

When polyvinyl chloride (PVC) is utilized as the vinyl halide polymer in the practice of the subject invention, spectroscopic evidence indicates that the gel fractions isolated from those partially crosslinked polymer blends contain only crosslinked ethylene copolymer, with no detectable PVC present. It is theorized, therefore, that essentially no crosslinking of the PVC occurs.

Although not essential components of the composition of this invention, various amounts of any number of conventional fillers or compounding ingredients may be admixed. Examples of such ingredients include various carbon blacks, clays, silica, alumina, calcium carbonate, titanium dioxide, antioxidants, antidegradants, tackifiers, processing aids such as lubricants and waxes, and plasticizers such as dialkylphthalates, trialkylmellitates and polyester oligomers. The amounts used depend, at least in part, upon the quantities of other ingredients in the composition and the properties desired from the composition. Also, minor amounts of other saturated and unsaturated polymers such as alpha-olefins may be added to reduce the cost or modify the properties of the composition.

The compositions of the subject invention are melt processible using conventional plastic processing equipment. Articles molded from the unique thermoplastic elastomeric compositions of the subject invention exhibit properties generally only associated with vulcanized rubber. For example, these compositions have resistance to compression set values of about 20 to 70 percent (70 to 100° C.); and elongation at break values of 150 to 600 percent without substantial permanent tensile set (i.e., less than about 15 percent). Various uses for these compositions include wire coverings, seals and gaskets, automotive parts, sheet liners and packaging films. They can be used to coat fabric, industrial belts and various hard surfaces by extrusion coating, for example, polyester, polyamide, polyimide or metal fibre or fabric reinforcement. They find utility in adhesive and sealant applications, as well as for modification of other polymer systems.

Further, compositions within the scope of this invention can be fabricated into tubing for laboratory, medical and industrial uses. Such tubing could also be used as the inner tube of reinforced hoses, wherein the extruded tube is overlaid with wire or textile cords, applied as a spiral, knit or braid. Optionally, a polymeric covering may be applied (extruded or spiral wound calendered sheet) over the reinforced tubing to provide protection from the working environment and mechanical abuse. Compositions within the scope of this invention can be used as the protective covering of reinforced tubes of similar or different composition.

The subject invention will be more fully appreciated with reference to the examples that follow:

EXAMPLE 1

Unless otherwise specified, the percentages given in all examples herein are on a weight percent basis. The intrinsic viscosities (iv) given for the polyvinyl chloride (PVC) are measured in solutions of 0.2 g of the polymer in 100 ml of cyclohexanone at 25° C. The melt indexes (MI) of the ethylene copolymers are measured at 190° C. according to ASTM D-1238.

The following formulations were blended as described below. The PVC, due to its thermal instability, was dry blended with the following stabilizer package as is typical in PVC compounding (percentages based on weight of PVC):

| Component | % |
|---|---|
| Ba/Cd laurates available from Argus Chemical Co. as "Mark" WS | 2.5 |
| Epoxidized soy oil available from Rohm and Haas Co. as "Paraplex" G62 | 8.2 |
| Liquid phosphite chelator available from Argus Chemical Co. as "Mark" 517 | 0.8 |
| Acrylic fusion aid available from Rohm and Haas Co. as "Acryloid" K120N | 2.5 |
| Polyethylene wax available from Allied Chemical Co. as "Allied" 6A | 3.3 |
| Stearic acid | 0.3 |

Batches A and B were blended in a Banbury internal mixer at 180° C. for 6 minutes and sheeted out on a conventional two-roll mill. Batch C was blended in a 28 mm twin screw co-rotating self wiping extruder having a barrel temperature of 200° C. throughout with an extrusion rate of 10 kg/hr. The blended composition exited the extruder through a strand die and was cut into 0.5 cm (3/16 inch) pellets. Batch D was prepared directly from batch C by adding carbon black on a two-roll rubber mill at 160° to 170° C. after the crosslinking described below.

Electron beam irradiation crosslinking of the ethylene copolymer/ PVC blends in these batches was performed under atmospheric conditions and at ambient temperatures with high energy electrons using a 2 Mev General Electric resonant transformer at 0.3 milliamp (dose rate, 3.0 Mrad/min). Doseage was controlled by the amount of time the blends were subjected to radiation. The blends were irradiated as a layer of 0.5 cm (3/16") pellets. Degree of crosslinking was monitored by observing the change in melt index as the dosage was increased. Irradiation was stopped when the melt index approached or reached a no-flow (no measurable melt index).

|  | Batch: | | | |
|---|---|---|---|---|
|  | A | B | C | D |
| E/28% VA[1]/10% CO (MI = 35) | 53% | 53% | — | — |
| E/25% VA/10% CO (MI = 35) | — | — | 66.5% | 60.5% |
| PVC ("Geon" 92)[2] iv = 1.02 | 23% | — | — | — |
| PVC (FPC-9300)[3] iv = 0.96 | — | 23% | 33.5% | 30.4% |
| Carbon black N-650[4] | 15% | 15% | — | — |
| Carbon black N-774[4] | — | —% | — | 9.1% |
| Polyester Oil ("Santicizer" 429)[5] | 9% | 9% | — | — |
| Irradiation Dosage (Megarads) | 1.3 | 1.0 | 1.0 | 1.0 |

[1]VA = vinyl acetate
[2]Sold by B. F. Goodrich Co.
[3]Sold by Firestone Plastics Co.
[4]ASTM grade designation
[5]Sold by Monsanto Chemical Co.

After blending and crosslinking, to demonstrate that these compositions were melt processible, each batch was placed in a mold at ambient temperature and loaded into a Pasadena hydraulic press, both platens of which had been preheated to 200° C. The pressure was raised to about 1.3 MPa (200 psig) and held for 5 minutes. The pressure was then slowly increased over a 3 minute period to 276 MPa (40,000 psig) and held for an additional 2 minutes. The press was then rapidly cooled to ambient temperature and the molded article removed. Physical measurements taken of each sample are tabulated below, showing that these samples exhibited properties of vulcanized rubber. The molded articles were re-melt processible.

|  | Batch: | | | |
|---|---|---|---|---|
|  | A | B | C | D |
| Shore A Hardness[1] | 74 | 74 | 69 | 85 |
| Compression set B (%)[2] (22 hrs at 70° C.) | 60 | 63 | 57 | 51 |
| % Volume swell[3] (7 days at 100° C.) | — | — | 68 | 64 |
| Clash-Berg Temp. °C.[4] | — | — | −13 | −8 |
| Tensile at break (psi)[5] | 1125 | 1185 | 1175 | 1323 |
| Elongation at break (%)[5] | 250 | 300 | 430 | 470 |
| $M_{100}$ (psi)[5] | 670 | 610 | 525 | 680 |
| $M_{200}$ (psi)[5] | 1050 | 940 | 730 | 941 |

[1]ASTM D-2240
[2]ASTM D-395
[3]ASTM D-200 (#3 Oil, 7 days at 100° C.)
[4]ASTM D-1043
[5]ASTM D-412

Example II The following formulations were blended as described below (values are in weight percent, and the PVC was stabilized as per Example I):

|  | Batch: | | | |
|---|---|---|---|---|
|  | A | B | C | D |
| E/62% MA[1]/3.5% MAME[2] | — | — | — | 68.6 |
| E/30% n-BA[3]/10% CO (MI = 5) | 57.2 | 48.6 | — | — |
| E/28% VA/10% CO (MI = 35) | — | — | 68.8 | — |
| PVC ("Geon" 92) iv = 1.02 | 30.1 | 26.2 | — | 29.4 |
| PVC (FPC-9300) iv = 0.96 | — | — | 29.4 | — |
| Polyester Oil ("Santicizer" 429) | 10.6 | 9.0 | — | — |
| Carbon black N-650 | — | 15.0 | — | — |
| CROSSLINKING AGENTS | | | | |
| p- and m- α,α'-bis(t-butylperoxy)diisopropylbenzene[4] | 0.9 | 0.8 | 1.0 | — |
| m-phenylenediamine-bis-maleimide[5] | 0.6 | 0.5 | 0.7 | — |
| chromium (III) 2,4-pentanedionate[6] | — | — | — | 2.0 |

[1]MA = methyl acrylate
[2]MAME = maleic acid monoethyl ester
[3]n-BA = n-butyl acrylate
[4]sold as "Vul-Cup" R by Hercules Chemical Co.
[5]sold as "HVA-2" by E. I. du Pont de Nemours and Company
[6]sold by Ventron Corp.

Batches A and B were blended by adding all ingredients except curatives to a Banbury internal mixer for 7.0 mins at 150° C. Crosslinking agents were than added and the temperature was increased to 190° C. and held at that temperature for 4.0 mins while mixing at high speed to induce partial crosslinking. The compositions were then extruded into tubing at 190° C. using a Brabender extruder fitted with a 0.6 cm (¼") tubing die thereby exhibiting thermoplastic processibility. These blends also easily injection molded at high speed, as illustrated by the following procedure: The compositions were fed to a reciprocating screw type injection molding machine, with all zones of the barrel heated to 170° C. and the mold at 25° C. Using a screw rpm of 144 and an injection pressure of 1200 psi., the molten material filled out the cavity of the plaque mold in 15 seconds and was allowed to cool an additional 10 seconds before the mold was opened and the finished part was ejected.

Batch C was prepared by blending the PVC and ethylene polymer in a 28 mm twin screw co-rotating self wiping extruder having a barrel temperature of 200° C. throughout with an extrusion rate of 10 kg/hr. The blended composition exited the extruder through a strand die and was cut into 0.5 cm (3/16 inch) pellets. The partial crosslinking was done in a Brabender laboratory mixer (Plasticord) as follows: polymer blend was added to the mixer and temperature was stabilized at 110° C. at slow speed (32 rpm), the crosslinking agents were then added and the temperature increased to 155° C. while mixing at fast speed (64 rpm) and was held for 15 mins and removed.

Batch D was blended in a Banbury mixer at 180° C. for 5 minutes. The blend was then transferred to a Brabender mixer (Plasticord) and the crosslinking agent was added. This mixture was held in the mixer for 5 minutes at 170° C. to effect crosslinking.

Samples of each Batch were compression molded as in Example I, the physical properties of the molded articles tabulated below.

|  | Batch: | | | |
|---|---|---|---|---|
|  | A | B | C | D |
| Shore A Hardness | 64 | 74 | 72 | 77 |
| Compression set B (%) | 22[2] | 37[2] | 38[3] | 64[3] |
| % Volume swell | 50 | 46 | — | 62 |
| Clash-Berg Temp. (°C.) | −26 | −23 | — | −36 |
| Tensile at break (psi) | 625 | 975 | 1845 | 1439 |
| Elongation at break (%) | 200 | 215 | 250 | 320 |
| $M_{100}$ (psi) | 300 | 450 | 650 | 330 |
| $M_{200}$ (psi) | 625 | 900 | 1450 | 840 |
| Permanent tensile set[1] (%) | 8 | 10 | — | 12 |

[1]ASTM D-412
[2]22 hrs at 100° C., ASTM D-395
[3]22 hrs at 70° C., ASTM D-395

EXAMPLE III

The following formulation was used to illustrate the use of an additional crosslinking agent:

|  | Weight % |
|---|---|
| E/30% n-BA/10% CO | 54 |
| PVC[1] | 29 |
| Dioctyl phthalate | 16.6 |
| LiCl.3MDA[2] | 0.4 |

[1]Stabilized with 2 phr of a tin thioglycolate available from M & T Chemicals, Inc. as "Thermolite" 133.
[2]Lithium chloride complex of 4,4'-diaminodiphenyl methane.

The E/n-BA/CO was added slowly to molten PVC at 190° C. and the composition homogeneously mixed on a two-roll mill. The dioctyl phthalate and LiCl.3MDA were added and the composition milled for 5 minutes at 190° C. The compression was then removed from the mill and compression molded into plaques, the physical properties tabulated below.

| Compression set B (%)[1] | 22.5 |
|---|---|
| % Volume swell | 36.2 |

[1]22 hrs at 70° C.

EXAMPLE IV

This example serves to illustrate the effect of crosslinking agent concentration on level of gel content. In these formulations the stabilized $PVC_1$ was first mixed with the trioctyltrimellitate in dry blending operation. The total formulations were then blended and simultaneously crosslinked in a 28 mm twin scew, co-rotating, self-wiping extruder as per Example I. The degree of crosslinking was assayed by determination of % gel content in tetyahydrofuran as detailed above (16 hrs, 23° C.). Sample A, which contains no curative and is therefore uncrosslinked, contains only a trace of gel (insolubles). All samples were compression molded as per Example I.

|  | Batch | | | |
|---|---|---|---|---|
| Formulations | A | B | C | D |
| E/30% n-BA/10% CO (MI = 5) | 60.0 | 59.7 | 59.5 | 59.3 |
| PVC[1] (iv = 1.04) | 28.5 | 28.4 | 28.3 | 28.2 |
| trioctyltrimellitate | 11.5 | 11.5 | 11.4 | 11.4 |
| Vul-Cup 40KE[2] | 0 | 0.3 | 0.6 | 0.9 |
| HVA-2[3] | 0 | 0.1 | 0.2 | 0.3 |

-continued

|  | Batch | | | |
|---|---|---|---|---|
| Formulations | A | B | C | D |
| % Gel | 0.8 | 26.2 | 35.2 | 39.4 |

[1]Available from Conoco Chemicals as product number 5425 and stabilized with 2.9% Ba/Cd laurates and 1.0% of a phosphite chelator (available from Argus Chemical Co. as Mark WS and Mark 517 respectively).
[2]p- and m-α,α'bis(t-butylperoxy)diisopropyl benzene, 40% on inert clay (available from Hercules Chemical Company)
[3]m-phenylenediamine-bis-maleimide (available from E. I. du Pont de Nemours and Company)

The following illustrates the versatility of the compositions of the subject invention:

Profile Extrusion

Batch C of Example IV in pellet form was fed to a 1 ½ inch (4.8 cm) diameter Royle extruder with a single stage plastics screw, having a length to diameter ratio of 15:1. The extruder was run at 50 rpm and at temperatures designed to produce melt temperatures of 130° C.; 163°–170° C. and 180°–193° C. At all three temperature ranges, the melt was extruded through a feather-edged profile die known as a Garvey Die.

The profile extrusion demonstration described above shows that compositions within the scope of this invention can be extruded as complex profiles, at relatively low melt temperatures, using standard extruders of L/D common to the rubber industry. Such extruded profiles could be used as gasketing or miscellaneous mechanical goods.

Continuous Extrusion Coating of Wire

Formulation C of Example IV, in pellet or cut granule form, were fed to a 1¼ inch (3.2 cm) diameter Brabender extruder, with a single stage plastics screw, having a length to diameter ratio of 25:1. The extruder was fitted with a crosshead die sized to produce a 0.050 inch (0.6–30 cm) thick coating on 12 AWG aluminum wire at a melt temperature of 197° C. and at rates of from 20 to 100 feet (0.6-30m) per minute.

The wire demonstration described above and the subsequently obtained physical and electrical properties show that compositions within the scope of this invention can be used to fabricate coated wire and cable, either as low voltage primary insulation or as jacketing or semiconductive coating in higher voltage constructions.

Milling and Calendering Sheet

Formulation C of Example IV, in pellet form, was massed and banded on a 8×20 inch (0.2–0.5 m) two-rubber mill, with a roll surface speed ratio of 1.2:1, and a roll temperature of 225° F. (107° C.). The polymer band was cut from the mill roll at a stock temperature of 270° F. (132° C.) and transferred to a three-roll rubber calender. With all three rolls held at 260° F.–275° F. (127° C.–135° C.), a reasonably smooth sheet of 0.015 inch 0.04 cm) thickness was formed and easily released, when cut from the center calender roll. Similar results were obtained when up to 20 phr. fumed silica and 10 phr. dioctyl sebecate were blended into the polymer band on the rubber mill, prior to calendering.

The milling and calendering demonstration described above shows that compositions within the scope of this invention can be fluxed and further compounded on rubber mills and then fabricated into sheet, using moderate processing temperatures, on standard rubber calenders. Such formed sheet may be used unsupported for elastomeric packaging film, or calendered onto fabrics or onto a web of reinforcing cords in single or multiple plies to be used for roofing, pit and pond liners, die-cut gasketing, diaphragms, conveyor belting and for general purpose coated fabric applications.

What is claimed is:

1. A partially crosslinked, thermoplastic, melt-processible, elastomeric blend of
(a) a copilymer of ethylene, at least one ethylenically unsaturated organic monomer X selected from the group consisting of esters of unsaturated $C_3$–$C_{20}$ mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha olefins of 3–12 carbon atoms, and vinyl aromatic compounds, and an additional monomer Y selected from the group consisting of ethylenically unsaturated $C_3$–$C_{20}$ carboxylic acids, carbon monoxide, and sulfur dioxide; and
(b) between 5 and 75 weight percent, based on the composition, of a vinyl or vinylidene halide polymer
wherein the comonomer content in (a) is such that the ehtylene copolymer is compatible with the vinyl or vinylidene halide polymer.

2. The blend of claim 1 wherein is incorporated one or more of the members of the group consisting of carbon black, clay, silica, alumina, calcium carbonate, titanium dioxide, dialkyl phthalates, trialkyl mellitates, polyester oligomers and minor amounts of alpha-olefin polymers.

3. The blend of claim 1 wherein the composition has a gel content of 5 to 90 percent based on total polymer weight.

4. The blend of claim 1 wherein the composition has a gel content of 10 to 70 percent based on total polymer weight.

5. The blend of claim 1 wherein the composition has a gel content of 20 to 40 weight percent based on total polymer weight.

6. The blend of claim 1 wherein (b) is polyvinyl chloride.

7. The blend of claim 2 wherein (b) is polyvinyl chloride.

8. The blend of claim 3 wherein (b) is polyvinyl chloride.

9. The blend of claim 4 wherein (b) is polyvinyl chloride.

10. The blend of claim 5 wherein (b) is polyvinyl chloride.

11. The blend of claim 1 wherein each organic monomer X is selected from the group consisting of methyl acrylate, butyl acrylate, vinyl acetate and maleic acid monoethyl ester.

12. The blend of claim 1 wherein the total organic monomers X are present in the copolymer in an amount of 1 to 60 weight percent based on copolymer, and the monomer Y is present in an amount of 1 to 30 weight percent based on copolymer.

13. A blend of claim 1 wherein (a) is of ethylene, a copolymerizable ethylenically unsaturated organic monomer, and a member of the group consisting of carbon monoxide and sulfur dioxide.

14. A blend of claim 1 wherein (a) is a copolymer of ethylene, a copolymerizable ethylenically unsaturated organic monomer, and an ethylenically unsaturated $C_3$–$C_{20}$ carboxylic acid.

15. A blend of claim 14 containing no polymerizable polyunsaturated compounds or their polymerization products.

16. A self-supporting film comprised of a partially crosslinked, thermoplastic, melt-processible, elastomeric blend of
(a) a copolymer of ethylene, at least one ethylenically unsaturated organic monomer X selected from the group consisting of esters of unsaturated $C_3$–$C_{20}$ mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha olefins of 3–12 carbon atoms, and vinyl aromatic compounds, and an additional monomer Y selected from the group consisting of ethylenically unsaturated $C_3$–$C_{20}$ carboxylic acids, carbon monoxide, and sulfur dixoide and
(b) between 5 and 75 weight percent, based on the composition, of a vinyl or vinylidene halide polymer
wherein the comonomer content in (a) is such that the ethylene copolymer is compatible with the vinyl or vinylidene halide polymer.

17. A self-supported sheet comprised of a partially crosslinked, thermoplastic, melt-processible, elastomeric blend of
(a) a copolymer of ethylene, at least one ethylenically unsaturated organic monomer X selected from the group consisting of esters of unsaturated $C_3$–$C_{20}$ mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha olefins of 3–12 carbon atoms, and vinyl aromatic compounds, and an additional monomer Y selected from the group consisting of ethylenically unsaturated $C_3$–$C_{20}$ carboxylic acids, ethylenically unsaturated $C_3$–$C_{20}$ carboxylic acids, carbon monoxide and sulfur dioxide; and
(b) between 5 and 75 weight percent, based on the composition, of a vinyl or vinylidene halide polymer
wherein the comonomer content in (a) is such that the ethylene copolymer is compatible with the vinyl or vinylidene halide polymer.

18. A molded article comprised of a partially crosslinked, thermoplastic, melt-processible, elastomeric blend of
(a) a copolymer of ethylene, at least one copolymerizable ethylenically unsaturated organic monomer X selected from the group consisting of esters of unsaturated $C_3$–$C_{20}$ mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha olefins of 3–12 carbon atoms, and vinyl aromatic compounds, and an additional monomer Y selected from the group consisting of ethylenically unsaturated $C_3$–$C_{20}$ carboxylic acids, carbon monoxide, and sulfur dioxide; and
(b) between 5 and 75 weight percent, based on the composition, of a vinyl or vinylidene halide polymer
wherein the comonomer content in (a) is such that the ethylene copolymer is compatible with the vinyl or vinylidene halide polymer.

19. An extruded profile comprised of a partially crosslinked, thermoplastic, melt-processible, elastomeric blend of (a) a copolymer of ethylene, at least one ethylenically unsaturated organic monomer X selected from the group consisting of esters of unsaturated $C_3-C_{20}$ mono- or dicarboxylic acids, vinyl esters of saturated $C_2-C_{18}$ carboxylic acids, vinyl alkyl ethers wherein the alkyl group has 1–18 carbon atoms, vinyl or vinylidene halides, acrylonitrile, methacrylonitrile, norbornene, alpha olefins of 3–12 carbon atoms, and vinyl aromatic compounds, and an additional monomer Y selected from the group consisting of ethylenically unsaturated $C_3-C_{20}$ carboxylic acids, carbon monoxide, and sulfur dixoide; and (b) between 5 and 75 weight percent, based on the composition, of a vinyl or vinylidene halide polymer wherein the comonomer content in (a) is such that the ethylene copolymer is compatible with the vinyl or vinylidene halide polymer.

20. A tubing comprised of a partially crosslinked, thermoplastic, melt-processible, elastomeric blend of (a) a copolymer of ethylene, at least one ethylenically unsaturated organic monomer X selected from the group consisting of esters of unsaturated $C_3-C_{20}$ mono- or dicarboxylic acids, vinyl esters of saturated $C_2-C_{18}$ carboxylic acids, vinyl alkyl ethers wherein the alkyl group has 1–18 carbon atoms, vinyl or vinylidene halides, acrylonitrile, methacrylonitrile, norbornene, alpha olefins of 3–12 carbon atoms, and vinyl aromatic compounds, and an additional monomer Y selected from the group consisting of ethylenically unsaturated $C_3-C_{20}$ carboxylic acids, carbon monoxide and sulfur dioxide; and (b) between 5 and 75 weight percent, based on the composition, of a vinyl or vinylidene halide polymer wherein the comonomer content in (a) is such that the ethylene copolymer is compatible with the vinyl or vinylidene halide polymer.

21. A polyester, polyamide, polyimide or metal fibre or fabric extrusion coated by a composition comprising a partially crosslinked, thermoplastic, melt-processible, elastomeric blend of (a) a copolymer of ethylene, at least one ethylenically unsaturated organic monomer X selected from the group consisting of esters of unsaturated $C_3-C_{20}$ mono- or dicarboxylic acids, vinyl esters of saturated $C_2-C_{18}$ carboxylic acids, vinyl alkyl ethers wherein the alkyl group has 1–18 carbon atoms, vinyl or vinylidene halides, acrylonitrile, methactrylonitrile, norbornene, alpha olefins of 3–12 carbon atoms, and vinyl aromatic compounds, wherein the comonomer content in (a) is such that the ethylene copolymer is compatible with the vinyl or vinylidene halide polymer.

* * * * *